United States Patent Office 3,470,294
Patented Sept. 30, 1969

3,470,294
VACCINE FOR IMMUNIZATION OF DOGS AND FOXES AGAINST DISTEMPER, HEPATITIS CONTAGIOSA AND LEPTOSPIROSIS AND PROCESS FOR PREPARING IT
Kurt Drager and Othmar Ackermann, Marburg (Lahn), Germany, assignors to Behringwerke Aktiengesellschaft, Marburg (Lahn), Germany, a corporation of Germany
No Drawing. Continuation-in-part of applications Ser. No. 294,173, July 10, 1963, and Ser. No. 534,319, Mar. 15, 1966. This application June 22, 1967, Ser. No. 647,923
Claims priority, application Germany, June 21, 1961, B 62,972; July 12, 1962, B 68,006
Int. Cl. A61k 23/00; C12k 5/00, 7/00
U.S. Cl. 424—89    10 Claims

ABSTRACT OF THE DISCLOSURE

A divalent vaccine comprising (1) a live apathogenic distemper virus adapted by passage through tissue cultures and (2) an inactivated hepatitis virus. A trivalent vaccine additionally containing (3) inactivated cultures of *Leptospira canicola* and *Leptospira icterohaemorrhagiae* and methods for making these vaccines.

---

This application is a continuation-in-part of application Ser. No. 294,173 filed July 10, 1963, and now abandoned, and of application Ser. No. 534,319 filed Mar. 15, 1966, now abandoned, which in turn is a continuation-in-part of application Ser. No. 186,363, filed Apr. 10, 1962, now also abandoned.

The present invention relates to composite vaccines for immunization against canine distemper and canine hepatitis, and to a process for the manufacture of such vaccines. The present invention further relates to composite vaccines for immunization against leptospirosis in addition to canine distemper and canine hepatitis and to a process for the manufacture of such vaccines.

Vaccines affording combined immunization against both canine distemper and canine hepatitis in dogs or foxes are known in the art. These vaccines are prepared by combining a first component comprising an inactivated canine hepatitis virus with a second component containing the distemper-virus. A suspension of the anti-hepatitis component is prepared by extracting hepatitis contagiosa canis (h.c.c.) virus from dog's liver and/or dog's spleen, or from tissue cultures, inactivating the virus with formaldehyde, and then binding free formaldehyde by the addition of a solution of the acid salts of sulfuric acid, particularly sodium bisulfate. The component comprising the distemper virus is in the form of a suspension obtained from chick embryo cultures.

U.S. Patent 3,098,011 to Rockborn describes a process for preparing a canine distemper vaccine comprising a living attenuated apathogenic distemper virus by cultivating the virus in at least 50 successive passages in a tissue culture, for example from a tissue culture of dog's kidney, using a buffered nutrient fluid at a pH value between 7 and 8.

Trivalent vaccines affording combined immunization against canine distemper, canine hepatitis and leptospirosis in dogs and foxes are also known in the art. These vaccines are prepared by adding a *Leptospira canicola* component to a combination of an inactivated canine hepatitis virus and an attenuated canine distemper virus, the latter combination being prepared as above described.

Such trivalent vaccine is described e.g. by Zuschek et al. in Cornell Vet. 51, pp. 68–76 (January 1961). The Zuschek vaccine consists of live canine distemper virus modified in chicken embryo chorioallantoic membranes, canine hepatitis virus inactivated with formalin and *Leptospira canicola* inactivated by several cycles of freezing and thawing.

It has now been found that an anti-distemper vaccine of the type shown in the Rockborn patent can be used as a component of a dual vaccine together with a component effective against canine hepatitis. The resulting dual vaccine shows a number of surprising and unexpected advantages over any dual vaccine now known in the art.

First, the vaccines of the present invention are stable and storable for much longer periods of time than are the dual vaccines now known to the art. The new vaccines are, thus, of greater commercial interest because the increased shelf-life facilitates distribution and the maintenance of supplies of potent vaccine.

Second, the vaccine of the present invention results in a quicker and improved generation of distemper antibodies, as compared with the number of distemper antibodies produced in the same time period by the vaccines of the prior art, and therefore provides more effective and longer protection in animals to which it is administered.

Third, and most surprising, the new vaccine of the invention increases the hepatitis antibody count in animals to which it is administered as compared with the hepatitis antibody count observed in animals receiving the dual vaccines of the prior art. It consequently leads to a longer protection against hepatitis contagiosa canis in animals to which it is administered as compared with the time of protection observed in animals receiving the dual vaccines of the prior art.

It has further been found that the above dual vaccine can be used as a component of a trivalent vaccine together with a component effective against leptospirosis. The addition of a component effective against leptospirosis not only offers the advantage of leading to a vaccine capable of simultaneously immunizing against canine hepatitis, canine distemper and leptospirosis but also has the unexpected and highly surprising effect that the stability of the distemper virus component is considerably enhanced.

The process of the present invention for the manufacture of a composite vaccine for immunization against distemper and hepatitis contagiosa canis comprises inactivating an organ material extract, preferably a canine liver extract, a canine spleen extract or a tissue culture extract containing hepatitis contagiosa canis virus, with formaldehyde, chemically binding excess formaldehyde with from 150 to 200% of the stoichiometric quantity of an acid salt of sulfurous acid, preferably sodium bisulfite, then mixing the resulting inactivated material with, preferably, a substantially equal amount of a live apathogenic distemper virus modified in at least 50 successive passages in a tissue culture of organs from animals susceptible to distemper. If it is desired, the mixture may subsequently be lyophilized.

The process for the manufacture of a composite vaccine for immunization against distemper, hepatitis contagiosa canis and leptospirosis comprises inactivating an organ material extract, preferably a canine liver extract, a canine spleen extract or a tissue culture extract containing hepatitis contagiosa canis virus, with formaldehyde, chemically binding excess formaldehyde with from 150 to 200% of the stoichiometric quantity of an acid salt of sulfurous acid, preferably sodium bisulfite, then mixing the resulting inactivated material with, preferably, a substantially equal amount of a live apathogenic distemper virus modified in at least 50 successive passages in a tissue culture of organs from animals susceptible to distemper, adding thereto a culture suspension of *Leptospira canicola* and a culture suspension of *Leptospira icterohaemorrhagiae*, both destroyed by freezing at very low temperatures, and if it is desired, subsequently lyophilizing the mixture.

In detail the above mentioned anti-hepatitis component, the anti-distemper component and the mixed vaccine comprising the two components can be prepared as follows:

(a)(1) Preparation of the h.c.c component of the combined vaccine from organ tissue The h.c.c.-component can be obtained according to Belgian Patent 581,259 (corresponding to British Patent 904,301).

For preparing the h.c.c. portion of the vaccine of the present invention, 100 grams of h.c.c.-virus-containing livers and spleens of dogs, the antigen of which is tested with the complement fixing reaction (KBR) in view of the content of antigen, are finely comminuted in a homogenizer, while cooling with ice. The material is then made up into a suspension by adding 2000 milliliters of distilled water. The suspension is collected in a bottle, and after addition of a formaldehyde solution of 35% strength the resulting mixture is thoroughly shaken for 1 hour in a shaking apparatus. The suspension is subsequently frozen and thawed three times to destroy the cells and to elute the virus contained in the cells, and then kept for one week at the temperature of the refrigerator (about 4° C.).

The suspension so treated is then centrifuged for 30 minutes at 3000 r.p.m. and the supernatant liquid is filtered off by suction. To 2700 milliliters of the extract thus obtained are added 300 milliliters of an aluminum hydroxide solution of 2% strength. There are thus obtained altogether 3000 milliliters of the inactivated h.c.c.-virus-containing vaccine portion consisting of 90% of an extract containing h.c.c.-viruses and 10% of an aluminum hydroxide solution of 2% strength. A sample is taken from this h.c.c. vaccine portion in order to determine the content of free and bound formaldehyde.

(2) Preparation of the h.c.c. component of the combined vaccine with a virus recovered from tissue cultures The renal cortex of a fresh kidney of a dog is recovered under as sterile conditions as possible. It is collected in a Petri dish and comminuted to small pieces having a size of 4–5 millimeters. These tissue pieces are then washed with a phosphate buffer solution (pH 7.5) according to Dulbecco, R. und Vogt, M. (J. of Exp. Med. 99, 167, 1954). Subsequently, the renal cortex pieces are treated with a trypsin solution in a water-bath at 37° C. By this treatment with trypsin, single cells are separated from the small organ pieces. The suspension of these separated cells is collected and the treatment with trypsin is discontinued by cooling in an ice-water bath. The trypsin solution and the blood corpuscles contained in the suspension are removed by centrifugation, at first at 1000 r.p.m., and, after having been washed twice with a phosphate buffer solution (pH 7.5), at 600 r.p.m. 10 milliliters of these washed kidney cells are then suspended in a mixture of 900 milliliters of Earle's solution containing about 0.25% of lactalbumin hydrolysate and 100 milliliters of calf-serum. A mixture of antibiotics consisting of 200,000 I.U. of penicillin, 200,000 of streptomycin and 200,000 of neomycin is then added to 1000 milliliters of this cell suspension and the pH-value of said suspension is adjusted to 7.0 by adding a sodium bicarbonate of 2.8% strength containing 0.001% of phenol red. This cell suspension is then placed in sterilized culture vessels, for example, Fernbach flasks, Erlenmeyer flasks, or test tubes, to about 8% of their capacity.

After about 4 to 6 days, the nutrient solution of the cell culture formed from the kidney cells has to be replaced and, if necessary, the pH-value has also to be readjusted in the following days by the addition of a sodium bicarbonate solution. As soon as the cell culture has completely developed, it is inoculated with a suspension containing h.c.c. viruses cultivated from the liver of a dog and adapted to a tissue of dog's kidney by several passages therethrough. After a complete cytopathogenic effect has developed and dead epithelial cells have separated, the h.c.c. virus is recovered, after about 4 days, by decanting off the cell suspension. The h.c.c. virus content or the antigenicity of the suspension is tested by inoculating cultures having different concentrations (virus titration) or by analyzing it by the complement fixation test. 0.1 to 0.2% by volume of a formaldehyde solution of 35% were added to the h.c.c.-virus containing cell suspension, and the cell suspension was then allowed to stand for one week at refrigerator temperature (about 4° C). 100 milliliters of an aluminum hydroxide suspension of 2% strength are finally added to 900 milliliters of the suspension.

(b) Preparation of the distemper component of the combined vaccine

The distemper component is obtainable as described in U.S. Patent 3,098,011. The distemper component can be produced by cultivating the distemper virus in at least 50 successive passages in a culture tissue while using a buffered nutrient fluid at a pH-value between 7.0 and 8.0, collecting the nutrient fluid thus obtained and containing the modified virus and, if necessary, lyophilizing.

As culture tissue for the distemper virus there are appropiate, for instance, kidneys of canidae and mustelidae, especially kidneys of 6 to 8 weeks old dog whelps. Furthermore, spleen, testicle and uterus tissue can be used.

As nutrient or culture fluid, Hanks' solution containing 0.5% of lactalbumin hydrolysate with about 10% of horse serum or 20% of calf serum, or Earle's solution containing about 2% of horse serum and 0.5% of lactalbumin hydrolysate containing about 100 units of penicillin and 50 mcg. of streptomycin per milliliter and showing a pH-value between 7.0 and 8.0, preferably of 7.6 are preferred. It is suitable to adjust to the optimal pH-value by means of sodium bicarbonate. The distemper virus is advantageously cultivated at a temperature between 30 and 37° C., preferably at 35 to 37° C.

For producing the distemper component on a larger scale the following method has proved advantageous:

Healthy 6 to 8 weeks old dog whelps, isolated under control for about 10 days in order to test their state of health, are used for the cultivation of distemper virus in tissue culture. For preparing tissue cultures, the whelps are sacrificed and the kidneys are freshly removed under sterile conditions. The kidney capsules are removed in a sterile chamber, the portions of connective tissue of the kidney pelvis are removed and the kidney cortex is cut into small pieces that are collected in a vessel and washed with distilled water containing 10% of phosphate buffer. The kidney pieces are then filled into a so-called trypsinization vessel. A trypsin solution of 0.25% strength warmed to about 37° C. is then introduced under sterile conditions. The trypsinization is carried out by permanently stirring with a magnetic stirrer, i.e. by action of this enzyme individual kidney cells are separated from the small pieces of tissue. The kidney cells suspended in the solution are drawn off and collected in a vessel. In order to stop the trypsinization process, the collecting vessel is placed into an ice-water bath. The period of action of the trypsin amounts to about 20–25 minutes. The trypsin is then removed by centrifugation. For this purpose the suspension of kidney cells is filled into centrifuge cups and centrifuged for about 5 minutes at about 1000 r.p.m. The centrifugation product is suspended with distilled water buffered by means of phosphate and again centrifuged at 600 r.p.m., whereby blood corpuscles may be removed. The cell sediment thus obtained is suspended in a nutrient solution in the ratio of 1:300 to 1:400. The nutrient solution used for the suspension advantageously consists of Hanks' solution with 0.5% of lactalbumin hydrolysate, 20% of calf serum, 100 units of penicillin and 50 mcg. of streptomycin per milliliter as well as of 0.01% of phenol red. In a sterile system the cell suspension is passed over gauze and filled into culture vessels such as rolled edge tubes, square bottles, Fernbach flasks or, preferably, so-called penicillin flasks. The culture vessels are incubated at a temperature of about 35–37° C., whereupon the kidney cells deposit at the glass walls and are multiplied due to cell-division. After about 4–5 days the nutrient fluid has to be replaced. This is done by decanting the exhausted nutrient solution or by drawing it off by means of a lifter. For feeding the culture, Hanks' solution with 0.5% of lactalbumin hydrolysate as described above is used, but containing only 10% of calf serum.

Generally, the culture layer is completely washed out after 2 to 3 additional days, so that inoculation with the distemper virus may be effected. For inoculation, Earle's solution containing 0.5% of lactalbumin hydrolysate, 2% of horse serum and the above-mentioned additions of antibiotics and phenol red is preferably used. Hanks' solution may also be used.

An apathogenic distemper virus suspension, (for instance virus of the 69th tissue passage in a ratio of 1:20 to 1:200), is now introduced into the culture vessel. The culture flasks are again incubated at about 35–37° C. They are subjected to daily microscopic examinations for changes typifying an increase of the distemper virus. Such characteristic changes are an intensified granulation of the cells, aggregation of the cells, aggregation of the cell nuclei with dissolution of the cell walls to form so-called giant cells which generally exhibit a granulated center and a plasma border with vacuole at the periphery. At this moment the cells continually deliver virus to the adjacent nutrient medium. This nutrient solution containing virus is harvested by decantation or siphoning. After the harvest, the culture tissue is suitably fed with fresh nutrient medium (Earle's solution as described above). Since the cells infested with the distemper virus keep their viability, distemper virus is permenently produced so that within a certain interval repeated harvest or feeding can be effected. It is thereby possible, for example, to obtain 4 to 9 harvests from one culture. The harvested virus suspension is preserved at a temperature of −35 to −70° C. and can thus be kept in stock for vaccine production. From the individual harvests, samples are taken which are examined as to sterility and titered as to their virus content in the tissue culture. The virus suspension that has been found suitable is thawed and—after adding a stabilizer solution—added to h.c.c. component or by small amounts filled into small bottles (of about 2 ml.), deep frozen and lyophilized.

The product thus obtained contains living apathogenic distemper viruses in dried form which are, therefore, stable over longer periods. After re-dissolution in a solvent, the solution can be used as a distemper component according to the present invention. It further is possible to add the lyophilized distemper component to a cell suspension containing the h.c.c. virus.

(c) Preparation of the mixed vaccine

A virus suspension containing modified distemper virus and obtained according to (b) from a tissue culture of dogs or mustelides, especially dogs' kidneys, is mixed, preferably with stirring and while being cooled with ice, with a hepatitis contagiosa canis virus suspension that has been treated with formaldehyde and a salt of sulfurous acid, preferably sodium bisulfite as described in (a). The mixture so obtained is filled into bottles and is deep frozen, preferably at a temperature of −40° C. while standing, and is finally lyophilized. The dried substance in the evacuated bottles is a vaccine against distemper and hepatitis contagiosa canis prepared in a stable and storable form.

As to the content of the distemper hepatitis contagiosa canis components, the vaccines prepared according to the process of the present invention can be characterized as follows: the vaccines have a distemper virus titer of about $10^{3.5}$ to $10^{4.5}D_{50}/m.^2$. For the preparation of the mixed vaccines, an h.c.c. antigen is used which has a complement fixing titre of 1:40 to 1:160, preferably 1:80.

To prepare the combined vaccine of the present invention, it is not necessary to mix substantially equal proportions of the distemper and the h.c.c. component. The proportion of the distemper component, which contains a living attenuated distemper virus, can be augmented or reduced below that of the h.c.c. component, i.e. the combined vaccine of the present invention may contain from about 5 to 75%, preferably 30 to 50% of the distemper component.

In order to obtain a sufficient immunity against hepatitis contagiosa canis, it is advisable to add from 0.1 to 0.5% (based on the amount of vaccine) of an adjuvant, such as saponine or a mineral oil, or about 5 to 25%, preferably about 10% of an aluminum hydroxide solution, preferably an aluminum hydroxide solution of 1–5%, optimally 2% strength.

(d) Preparation of the leptospirosis component of the combined vaccine

The leptospirosis component is obtainable e.g. as described by Jull et al. in "J. small anim. Pract.," vol. 1 pp. 246. It can be produced by separately growing *Leptospira canicola* and *Leptospira icterohaemorrhagiae* in a culture suspension, destroying the leptospirae by deep-freezing, adjusting the cultures microscopically in a dark field to $100\times10^6$ organisms per milliliter each, and combining them. The leptospirosis component thus obtained preferably contains substantially equal proportions of *Leptospira canicola* and *Leptospira icterohaemorrhagiae*. However, is is also possible to alter the proportions of *Leptospira canicola* and *Leptospira icterohaemorrhagiae* within the range of from 1:2 and 2:1 without fundamentally altering the properties of the leptospirosis component.

(e) Preparation of the combined trivalent vaccine

To prepare the combined trivalent vaccine of the present invention, about two parts by volume of the leptospirosis component as described in item (d) are added to about 20 parts by volume of a dual vaccine containing canine distemper virus and hepatitis contagiosa canis virus as hereinbefore described in item (c). In order to stabilize the vaccines of the present invention, it is advantageous to add a stabiliser such as, for example, the above-mentioned tissue culture media. Hanks' solution or Earle's solution or further sera, for example, horse sera, calf sera, beef sera, a solution of gelatine, a chemically modified solution of gelatine, beef nutrient broth, especially of a pH-value of 7–8, a solution of glucose, sucrose, milk protein preparations, whey etc., usually in an amount of 10 to 60%, preferably 25–30% of the vaccine.

It is usual, but not necessary, to lyophilize the mixture obtained according to the process of the present invention. Lyophilizing is unnecessary if the vaccine is used at once for vaccination or if it is possible to store or transport the vaccine in a deep frozen state.

To combine a living distemper virus with an inactivated h.c.c. virus according to the present invention, it is absolutely necessary to remove the formaldehyde used for inactivation of the h.c.c. vaccine component. This can be done — as mentioned above — by adding an acid salt of sulfurous acid, preferably sodium bisulfite.

A preferred dual vaccine of the present invention comprises substantially equal proportions of a component (a) that is active on distemper consisting of about 10–50, preferably 25% of a tissue culture containing a modified distemper virus, 30–75, preferably 60%, of a beef nutrient broth at a pH value of 7–8, preferably 7.6, and 3–30, preferably 15%, of a glucose solution of 20–70, preferably 50% strength, and of a component (b) that is active in hepatitis contagiosa canis consisting of about 90% of an extract containing an inactivated hepatitis contagiosa canis virus and 5–25, preferably 10%, of an aluminum hydroxide solution of 1–5, preferably 2% strength.

A preferred trivalent vaccine of the present invention contains 20 parts by volume of the above dual vaccine, 1 part of volume of *Leptospira canicola* and 1 part by volume of *Leptospira icterohaemorrhagiae*, each prepared as described in item (d).

The following examples illustrate the invention.

EXAMPLE 1

1000 cc. of a suspension obtained from a tissue culture of dogs' kidney containing the modified distemper virus were mixed, while being cooled with ice, with 1000 cc. of a hepatitis contagiosa canis virus suspension that has been treated with formaldehyde and sodium bisulfite. 2 cc. each of the mixture so obtained were filled into bottles, frozen at a temperature of $-40°$ C. while standing, and finally lyophilized. The dried substance in the evacuated bottles was a vaccine against distemper and hepatitis contagiosa canis prepared in a stable and storable form.

EXAMPLE 2

1000 cc. of suspension obtained from a tissue culture of dogs' kidney, containing the modified distemper virus, were mixed while being cooled with ice, with 1000 cc. of a hepatitis contagiosa canis virus suspension inactivated by means of formaldehyde and treated with sodium bisulfite and that contained 0.2% of aluminum hydroxide. To said mixture there were added 100 cc. of a culture suspension of *Leptospira canicola* adjusted microscopically in a dark field to a density of $100 \times 10^6$ organisms per milliliter and 100 cc. of a culture suspension of *Leptospira icterohaemorrhagiae* adjusted in the same way to a density of $100 \times 10^6$ organisms per milliliter and destroyed by freezing at very low temperatures, 2.2 cc. each of the mixture so obtained were filled into bottles and were frozen at a temperature of $-40°$ C. while standing and finally lyophilized.

The dried substance in the evacuated bottles was a vaccine against distemper, hepatitis contagiosa canis and leptospirosis prepared in a stable and storable form.

Tests for tolerance and action, and assay of antibody titres of the vaccines prepared according to the process of the present invention (1) Dual vaccine effective against canine distemper and hepatitis contagiosa canis immunization.—Seven mongrel pups (eight weeks old) of one brood and susceptible to hepatitis contagiosa canis were placed in an isolation kennel. Five of these pups were vaccinated subcutaneously each with one dose =2 cc. of the vaccine prepared according to the process of the present invention and consisting of equal proportions of (A) a component containing 25% of tissue culture containing modified distemper virus, 60% beef nutrient broth at pH 7.6 and 15% of a 50% glucose solution, and (B) a component containing 90% inactivated h.c.c. virus extract and 10% of a 2% aluminum hydroxide solution. The vaccine had a distemper virus titre of $10^{2.625}$ TCID$_{50}$. The abbreviation TCID means Tissue Culture Infectivity Dose. TCID$_{50}$ is the dose that causes a cytopathogenic effect in 50% of the tissue cultures. It is calculated according to the method of Reed and Muench (Am. J. Hyg. 27, 493 (1938). The two untreated pups remained as controls.

Tolerance.—All the seven pups remained healthy during the 8 weeks' observation period. Only three of the vaccinated dogs — 4 or 5 days after being vaccinated — showed a moderate ephemeral raise in temperature but without other clinical symptoms.

Demonstration of the antibodies against distemper.—Before starting the test and 3 weeks after the vaccination serum, samples were taken from all dogs, and said samples were examined in the virus neutralization test for antibodies against distemper and hepatitis contagiosa canis. After being vaccinated, all the dogs had in the blood serum a considerable quantity of the distemper virus neutralizing antibodies, whereas three weeks after the vaccination no distemper antibodies were detected in the untreated control dogs. The average quantity of antibodies in the vaccinated dogs were 1,317,740 distemper virus neutralizing dogs (distemper-v.n.d.). The distemper-v.n.d. are calculated according to the aforementioned method of Reed and Muench. They are the product of the quantity of virus—ID$_{50}$ used in the virus neutralization test, multiplied by the reciprocal of 50% of the neutralizing final value of the examined serum. They are calculated on 1 cc. of the undiluted serum (Dräger, Ackermann, Barth: Medizin und Chemie, vol. VI/58 (1958) Farbwerke Hoechst AG., Verlag Chemie, Weinheim/Bergstrabe).

Assay of antibodies against hepatitis contagiosa canis

On examining the blood serum of dogs for hepatitis contagiosa canis antibodies, no h.c.c. neutralizing antibodies were detected before the vaccination; three weeks after the vaccination, however, all the vaccinated dogs possessed a satisfying quantity of hepatitis contagiosa canis v.n.d. In the serum of the dogs that had not been vaccinated, no hepatitis contagiosa canis antibodies could be detected. The average quantity of serum antibodies in the vaccinated dogs was 987,988 hepatitis contagiosa canis v.n.d. The hepatitis contagiosa canis v.n.d. are calculated in the same manner as the distemper v.n.d. They are demonstrated in a tissue culture of dogs' kidney epithelial tissue, whereas distemper v.n.d. are demonstrated in the chick embryo.

Test infection with distemper virus

Five weeks after vaccination, the vaccinated dogs as well as the control dogs were infected subcutaneously with a distemper virus stock pathogenic for dogs. The virus stock used causes the so-called virus period of distemper in dogs that are susceptible to distemper, this period being characterized by a temperature curve showing two climaxes. During the period when the second climax is reached, the distemper virus can be detected in the isolated organs of the sick dogs by complement fixation tests.

After the test infection, all the vaccinated dogs remained completely healthy and free from fever, the two untreated control dogs, however, showed the typical symptoms of a distemper infection. The distemper virus was detected by complement fixation tests.

Test infection with hepatitis contagiosa canis virus

A fortnight after the infection with the distemper virus, all the vaccinated and control dogs were also infected with a hepatitis contagiosa canis virus pathogenic for dogs. All the vaccinated dogs remained healthy and showed no symptoms for hepatitis contagiosa canis. The infected control dogs developed a fever, became ill with hepatitis contagiosa canis and finally died. Hepatitis contagiosa canis was detected in them by post-mortem examination and by the demonstration of the virus in the complement fixation tests.

Experiment in practice

The vaccine prepared according to the present invention was tested under field conditions. Nine different testers vaccinated 292 dogs subcutaneously with one dose of 2 cc. each. The vaccinated dogs were examined with regard to local and general tolerance of the vaccine. Furthermore, shortly before and four weeks after the vaccination, serum samples for the examination for virus neutralizing antibodies were taken from some of the vaccinated dogs.

The vaccine proved to be of a good tolerance and to be suitable for immunization and did not cause any remarkable side effects. The serum samples always contained a considerable quantity of distemper virus neutralizing antibodies, thus confirming the excellent activity of the vaccine.

(2) Trivalent vaccine effective against canine distemper, hepatitis contagiosa canis and leptospirosis

A. Tests in dogs

Immunization.—8 eight weeks old pups of one brood and susceptible to distemper, hepatitis contagiosa canis and leptospirosis were placed in an isolation kennel. Four of these pups were vaccinated subcutaneously each with a single dose consisting of 2 milliliters of the vaccine prepared according to the process of the present invention. The vaccine had a distemper content of $10^{4.375}$ $TCID_{50}$. The abbreviation $TCID_{50}$ means 50% of the Tissue Culture Infectivity Dose. It is calculated according to the method of Reed and Muench (Am. J. Hyg. 27, 493, 1938). Four untreated dogs remained as controls. Two of them were used for the test infection with the pathogenic distemper virus and the other two were used for the test infection with the pathogenic hepatitis contagiosa canis virus.

Tolerance.—All the eight pups remained healthy during the 10 weeks' observation period. Only 4 of the vaccinated dogs—4 or 5 days after being vaccinated—showed a moderate ephemeral rise in temperature but without other clinical symptoms. The aluminum hydroxide, contained in the vaccine, caused the formation of a vaccine depot at the place where the vaccination had been effected. This depot may grow to the size of a bean and is resorbed within 1 to 3 weeks.

Action (a) Assay of antibodies against distemper, hepatitis contagiosa canis and leptospirosis.—Before starting the test and 4 weeks after the vaccination, blood samples were taken from all the dogs, and these samples were examined in the virus neutralization test in the tissue culture for antibodies against distemper and hepatitis contagiosa canis and in the agglutionation-lysis-reaction for antibodies (agglutinins) against leptospirosis (*Leptospira canicola* and *Leptospira icterohaemorrhagiae*). The vaccination effect is illustrated in the attached table 1. Before the vaccination all dogs possessed neither antibodies against distemper or hepatitis contagiosa canis nor agglutinins against *Leptospira canicola* or *Leptospira icterohaemorrhagiae*. Four weeks after the vaccination all the vaccinated dogs exhibited an equal and high content of distemper and hepatitis contagiosa canis virus neutralizing antibodies and of agglutinins against *Leptospira canicola* and *Leptospira icterohaemorrhagiae*.

The virus neutralizing doses (v.n.d.) were calculated according to the aforementioned method of Reed and Muench. They are the product of the quantity of virus-$ID_{50}$ used in the virus neutralization test, multiplied by the reciprocal of 50% of the neutralizing final value of the examined serum. The virus neutralizing doses are calculated on 1 milliliter of the undiluted serum (cf. Dräger, Ackermann, Barth: Medizin und Chemie VI, 532, 1958).

(b) Test infection with pathogenic distemper and hepatitis contagiosa canis virus.—6 weeks after the vaccination, the vaccinated dogs as well as the two distemper control dogs were infected subcutaneously with a distemper virus stock pathogenic for dogs. The virus stock used causes the so-called virus period of distemper in dogs that are susceptible to distemper, this period being characterized by a temperature curve showing 2 climaxes. During the period when the second climax is reached, the distemper virus can be detected in the organs of the sick dogs by complement fixation tests. After the test infection, all the vaccinated dogs remained completely healthy and free from fever. The two untreated distemper control dogs, however, showed the typical symptoms of a distemper infection. The distemper virus was detected by complement fixation tests.

A fortnight after the infection with the distemper virus all the vaccinated dogs and the two untreated hepatitis contagiosa canis controls were also infected with a hepatitis contagiosa canis virus pathogenic for dogs. All the vaccinated dogs remained healthy and showed no symptoms of hepatitis contagiosa canis. The infected control dogs developed a fever, fell sick with hepatitis contagiosa canis and finally died. Hepatitis contagiosa canis was detected in them by post-mortem result and by the demonstration of the virus in the complement fixation tests. The vaccine prepared according to the present invention was tested in dogs in further tests and under field conditions, the results obtained in the aforementioned example being thus confirmed. The vaccine proved to be of a good tolerance and did not cause any considerable side effects.

(B) Tests in laboratory animals

The vaccine prepared according to the process of the present invention was not only tested in dogs but also in albino mice, guinea pigs and gold hamsters with regard to its tolerance and innocuity. Guinea pigs and gold hamsters were also used for testing the action against leptospirosis (Stuttgart disease and Weil's disease). For testing tolerance and innocuousness of the vaccine albino mice were vaccinated intracerebrally and guinea pigs and gold hamsters were vaccinated subcutaneously with the redissolved vaccine ready for use. The animals were observed for 10 days. They were expected not to fall ill. For testing the action against *Leptospira icterohaemorrhagiae*, guinea pigs were vaccinated subcutaneously with 0.5 milliliter each and gold hamsters with 0.3 milliliter each of the redissolved vaccine ready for use at an interval of 1 week. 2 weeks after the vaccination the blood was extracted from the animals, and the serum, obtained from the blood samples, was examined for agglutinins (antibodies) against *Leptospira canicola* and *Leptospira icterohaemorrhagiae*. The formation of hepatitis contagiosa canis antibodies in guinea pigs can also be examined by testing the serums in the virus neutralization test in a tissue culture. The attached Table 2 represents the test procedure for a charge of the vaccine prepared according to the process of the present invention.

Instead of the serological test for antibodies against leptospirae, the action of the vaccine can also be tested by a test infection with pathogenic cultures of leptospirae. The experiment, represented in Table 3, was carried out in the same way as that represented in Table 2. Instead of extracting the blood, the gold hamsters were infected with pathogenic cultures of *Leptospira canicola*. The vaccinated animals remained healthy; the non-vaccinated control animals fell ill or died of leptospirosis. The diagnosis was confirmed by post-mortem result.

As can be seen from the examples, the administration of the vaccine prepared according to the process of the present invention leads to a simultaneous protection against distemper, hepatitis contagiosa canis and leptospirosis (*Leptospira canicola* and *Leptospira icterohaemorrhagiae*) which is distinguished by its good quality and regularity.

TABLE 1.—TEST IN DOGS FOR TOLERANCE AND ACTION OF THE TRIVALENT VACCINE OF THE PRESENT INVENTION

| Dog No. | | | Immune biological status before vaccination against— | | | | Immune biological status 4 weeks after vaccination against— | | | | Test infection with— | |
|---|---|---|---|---|---|---|---|---|---|---|---|---|
| | | | Distemper | h.c.c. | Agglutinins against— | | Distemper | h.c.c. | Agglutinins against— | | Distemper virus | h.c..c. virus |
| | | | | | l. can. | l. ict. | | | l. can. | l. ict. | | |
| 1 | Sbc. vacc. of each dog with 1 dose of 2 ml. | A fortnight later revacc. of each dog with 2 ml. of lept. vacc. sbc. | No v.n.d | No v.n.d | No | No | 994,698 v.n.d | 749,236 v.n.d | 1:200 | 1:800 | Healthy | Healthy. |
| 2 | | | No v.n.d | No v.n.d | No | No | 994,698 v.n.d | 999,192 v.n.d | 1:400 | 1:800 | do | Do. |
| 3 | | | No v.n.d | No v.n.d | No | No | 994,698 v.n.d | 215,291 v.n.d | 1:400 | 1:800 | do | Do. |
| 4 | | | No v.n.d | No v.n.d | No | No | 2,140,360 v.n.d | 999,192 v.n.d | 1:200 | 1:800 | do | Do. |
| 5 | Controls for distemper test infection. | | No v.n.d | No v.n.d | No | No | No v.n.d | No v.n.d | No | No | Ill [1] | |
| 6 | do | | No v.n.d | No v.n.d | No | No | No v.n.d | No v.n.d | No | No | Ill [1] | |
| 7 | Controls for h.c.c. test infection. | | No v.n.d | No v.n.d | No | No | No v.n.d | No v.n.d | No | No | | Ill.[2] |
| 8 | do | | No v.n.d | No v.n.d | No | No | No v.n.d | No v.n.d | No | No | | Ill.[2] | v.n.d.=virus neutralizing doses.
[1] Ill of distemper, virus detected in the organs by complement fixation tests.
[2] Ill of hepatitis contagiosa canis, virus detected in the organs by complement fixation tests.
h.c.c.=hepatitis contagiosa canis.

TABLE 2.—TEST IN GUINEA PIGS AND GOLD HAMSTERS FOR TOLERANCE AND ACTION OF THE TRIVALENT VACCINE OF THE PRESENT INVENTION

| | 1st vaccin. with Candur SHL [1] | 2nd vaccin. with Candur SHL [1] (1 week later) | Tolerance | Result of the agglutin.-lysis reaction against [2]— | | Result of the examination for h.c.c.-virus neutralizing antibodies |
|---|---|---|---|---|---|---|
| | | | | l. icteron | l. canicola | |
| Guinea pig. No.: | | | | | | |
| 989 | 0.5 ml. sbc | 0.5 ml. sbc | No findings | 1:80+ | 1:80+ | 45,254 h.c.c.-v.n.d. |
| 990 | 0.5 ml. sbc | 0.5 ml. sbc | do | 1:80+ | 1:40+ | 61,721, h.c.c.-v.n.d. |
| 991 | 0.5 ml. sbc | 0.5 ml. sbc | do | 1:40+ | 1:40+ | 100,259 h.c.c.-v.n.d. |
| 992 | 0.5 ml. sbc | 0.5 ml. sbc | do | 1:80+ | 1:60+ | 100,259 h.c.c.-v.n.d. |
| 993 | 0.5 ml. sbc | 0.5 ml. sbc | do | 1:80+ | 1:40+ | 42,170 h.c.c.-v.n.d. |
| 994 | 0.5 ml. sbc | 0.5 ml. sbc | do | 1:40+ | 1:40+ | 68,130 h.c.c.-v.n.d. |
| Gold hamster No.: | | | | | | |
| 234 | 0.3 ml. sbc | 0.3 ml. sbc | No findings | 1:80+ | 1:80+ | ([2]). |
| 235 | 0.3 ml. sbc | 0.3 ml. sbc | do | | | |
| 236 | 0.3 ml. sbc | 0.3 ml. sbc | do | 1:20+ | 1:10+ | |
| 237 | 0.3 ml. sbc | 0.3 ml. sbc | do | 1:40+ | 1:20+ | |
| 238 | 0.3 ml. sbc | 0.3 ml. sbc | do | 1:80+ | 1:80+ | |
| 239 | 0.3 ml. sbc | 0.3 ml. sbc | do | 0:40+ | 1:40+ | |

[1] Candur SHL=registered trademark. It represents the trivalent vaccine obtained according to the present invention.
[2] Extraction of the animals' blood 2 weeks after the 2nd vaccination TABLE 3.—TEST IN GOLD HAMSTERS FOR TOLERANCE AND ACTION OF THE TRIVALENT VACCINE OF THE PRESENT INVENTION

| | 1st vaccin. with Candur SHL | 2nd vaccin. with Candur SHL (1 week later) | Tolerance | Result of the test infection with pathogenic l. canicola culture intraperitoneal |
|---|---|---|---|---|
| Gold hamster No.: | | | | |
| 240 | 0.3 ml. sbc | 0.3 ml. sbc | No findings | No findings. |
| 241 | 0.3 ml. sbc | 0.3 ml. sbc | do | Do. |
| 242 | 0.3 ml. sbc | 0.3 ml. sbc | do | Do. |
| 243 | 0.3 ml. sbc | 0.3 ml. sbc | do | Do. |
| 244 | 0.3 ml. sbc | 0.3 ml. sbc | do | Do. |
| 245 | 0.3 ml. sbc | 0.3 ml. sbc | do | Do. |
| 258 | Untreated controls | | | Died 7 days after the infection. |
| 259 | do | | | Died 9 days after the infection.[1] |
| 260 | do | | | Died 6 days after the infection. |
| 261 | do | | | Taken ill; remained alive. |

[1] Necropsy typical for leptospirosis (petechial bleeding).

We claim:

1. A process for the manufacture of a composite vaccine for immunization against distemper and hepatitis contagiosa canis which comprises inactivating a canine liver or spleen organ material extract or tissue culture thereof containing hepatitis contagiosa canis virus with formaldehyde, chemically binding excess formaldehyde with 150–200 percent of the stoichiometric quantity of an acid salt of sulfurous acid, then mixing the resulting inactivated material with a substantially equal amount of a live apathogenic distemper virus obtained by cultivating pathogenic distemper virus in at least 50 successive passages through a tissue culture of kidney, spleen, testicle, and/or uterus organs from animals of the families Canidae and Mustelidae susceptible to distemper.

2. A process as in claim 1 wherein said composite vaccine is subsequently lyophilized.

3. A composite vaccine which consists essentially of (a) a live apathogenic distemper virus adapted by at least 50 successive passages of pathogenic distemper virus through tissue cultures of kidney, spleen, testicle, and/or uterus organs from animals of the families Canidae and Mustelidae susceptible to distemper, and (b) an inactivated hepatitis contagiosa canis virus, said hepatitis contagiosa canis virus being substantially free from unbound formaldehyde, said vaccine being produced in accordance with claim 1.

4. A composite vaccine as in claim 3 which additionally comprises an adjuvant.

5. A composite vaccine as in claim 3 wherein said acid salt of sulfurous acid is sodium bisulfite.

6. A process for the manufacture of a composite vaccine for immunization against distemper, hepatitis contagiosa canis, and leptospirosis, which comprises inactivating a canine liver or spleen organ material extract or tissue culture thereof containing hepatitis contagiosa canis virus with formaldehyde, chemically binding excess formaldehyde with 150–200 percent of the stoichiometric quantity of an acid salt of sulfurous acid, then mixing the resulting inactivated material with a substantially equal amount of a live apathogenic distemper virus obtained by cultivating pathogenic distemper virus in at least 50 successive passages through a tissue culture of kidney, spleen, testicle, and/or uterus organs from animals of the families Canidae and Mustelidae susceptible to distemper, and adding to about 20 parts by volume of the mixture thus obtained about 2 parts by volume of a culture containing substantially equal proportions of Leptospira

*canicola* and *Leptospira icterohaemorrhagiae* destroyed by deep-freezing and each adjusted to a density of about $100(10^6)$ organisms per milliliter each.

7. A process as in claim 6 wherein said composite vaccine is subsequently lyophilized.

8. A composite vaccine consisting essentially of (a) a live apathogenic distemper virus adapted by at least 50 successive passages of pathogenic distemper virus through tissue cultures of kidney, spleen, testicle, and/or uterus organs from animals of the families Canidae and Mustelidae susceptible to distemper, (b) an inactivated hepatitis contagiosa canis virus, said heptatis contagiosa canis virus being substantially free of unbound formaldehyde, and (c) *Leptospira canicola* and *Leptospira icterohaemorrhagiae* cultures destroyed by deep-freezing and adjusted to a density of about $100(10^6)$ organisms per milliliter each, said vaccine being produced in accordance with claim 6.

9. A composite vaccine as in claim 8 which additionally comprises an adjuvant.

10. A composite vaccine as in claim 8 wherein said acid salt of sulfurous acid is sodium bisulfite.

References Cited

UNITED STATES PATENTS 3,098,011   7/1963   Rockborn _____ 424—99

LEWIS GOTTS, Primary Examiner

S. K. ROSE, Assistant Examiner

U.S. Cl. X.R.

195—1.3, 1.4, 1.5; 424—92